June 8, 1937.  R. S. BROWN ET AL  2,083,312
METALWORKING MACHINE
Original Filed July 1, 1931  12 Sheets-Sheet 1

INVENTORS
ROBERT S. BROWN
WILLIAM B. RETZ
BY
ATTORNEYS

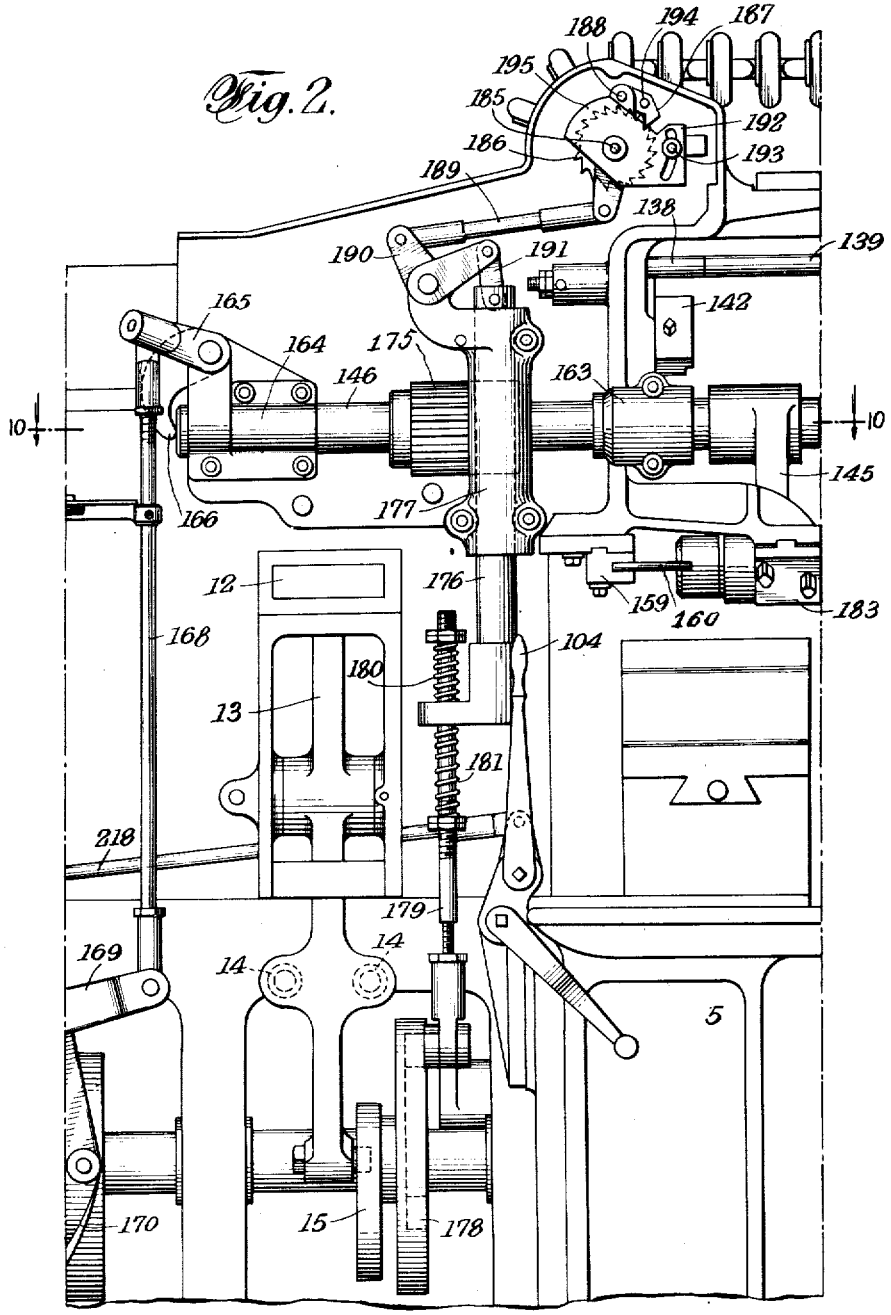

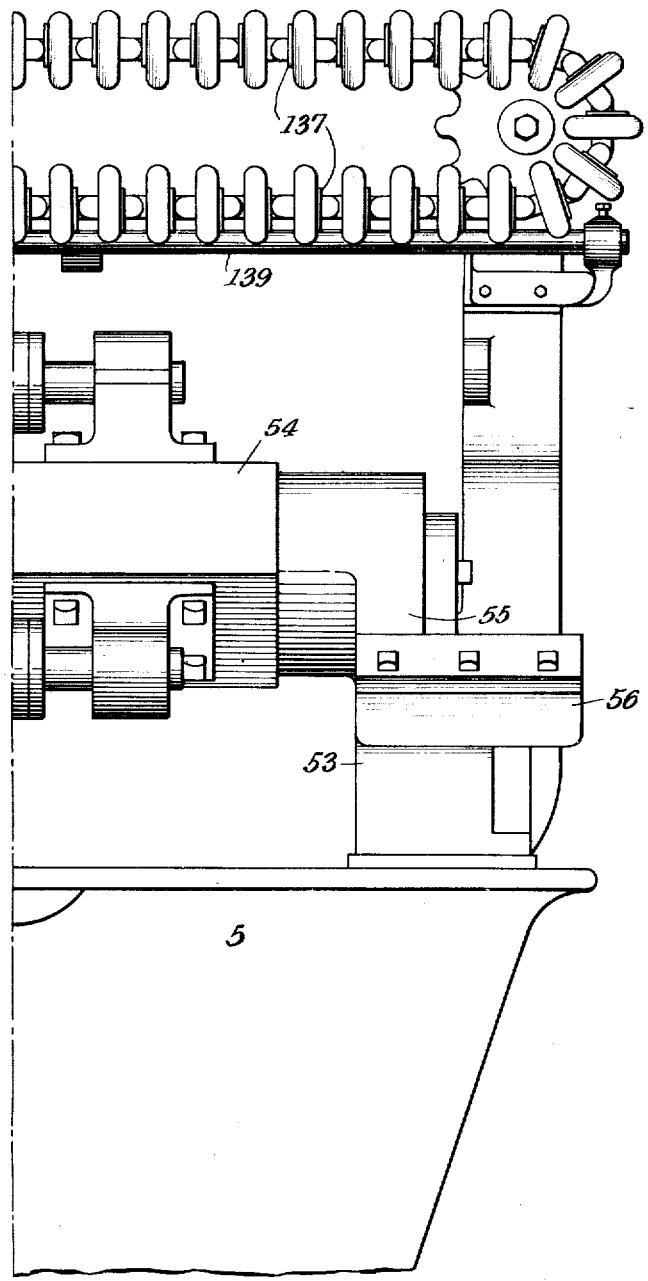

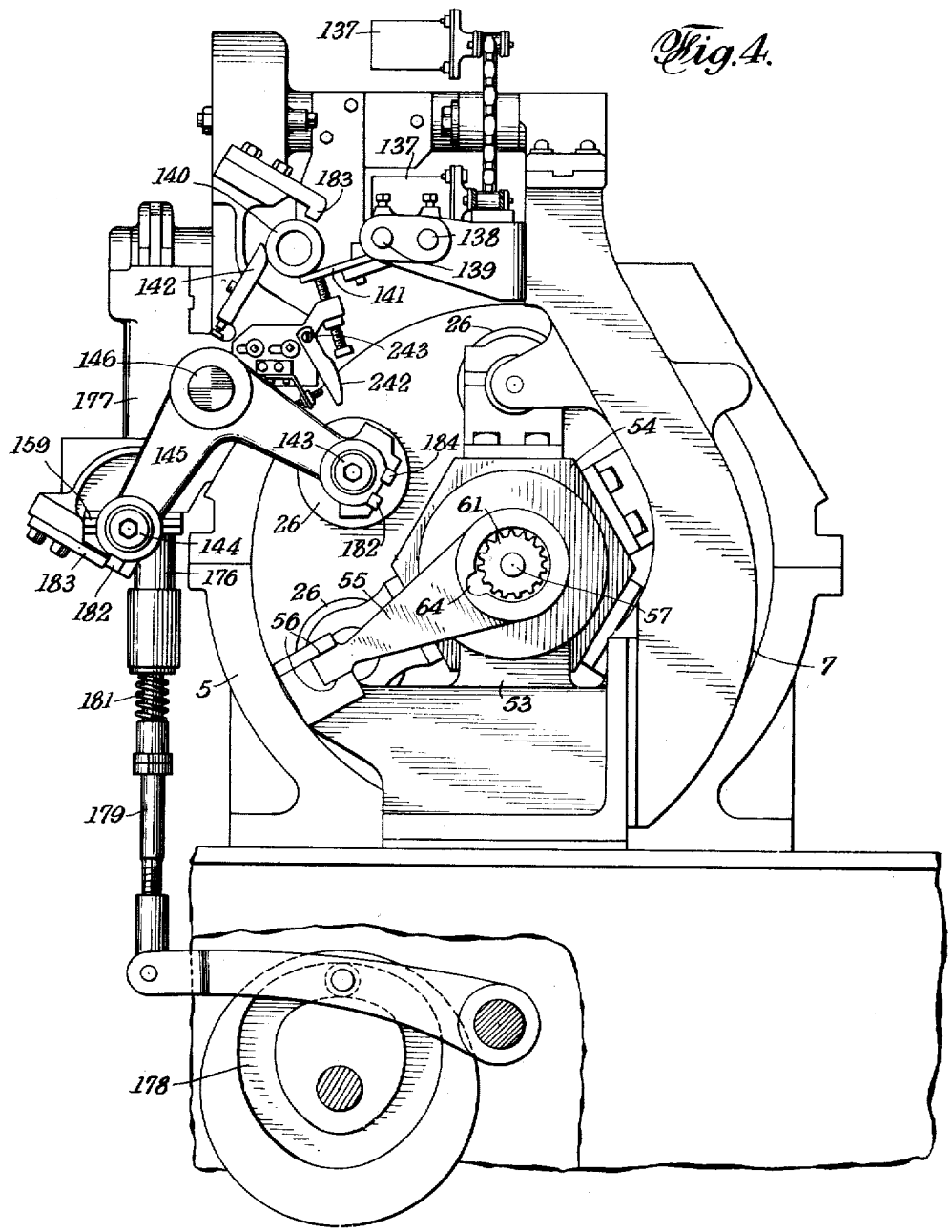

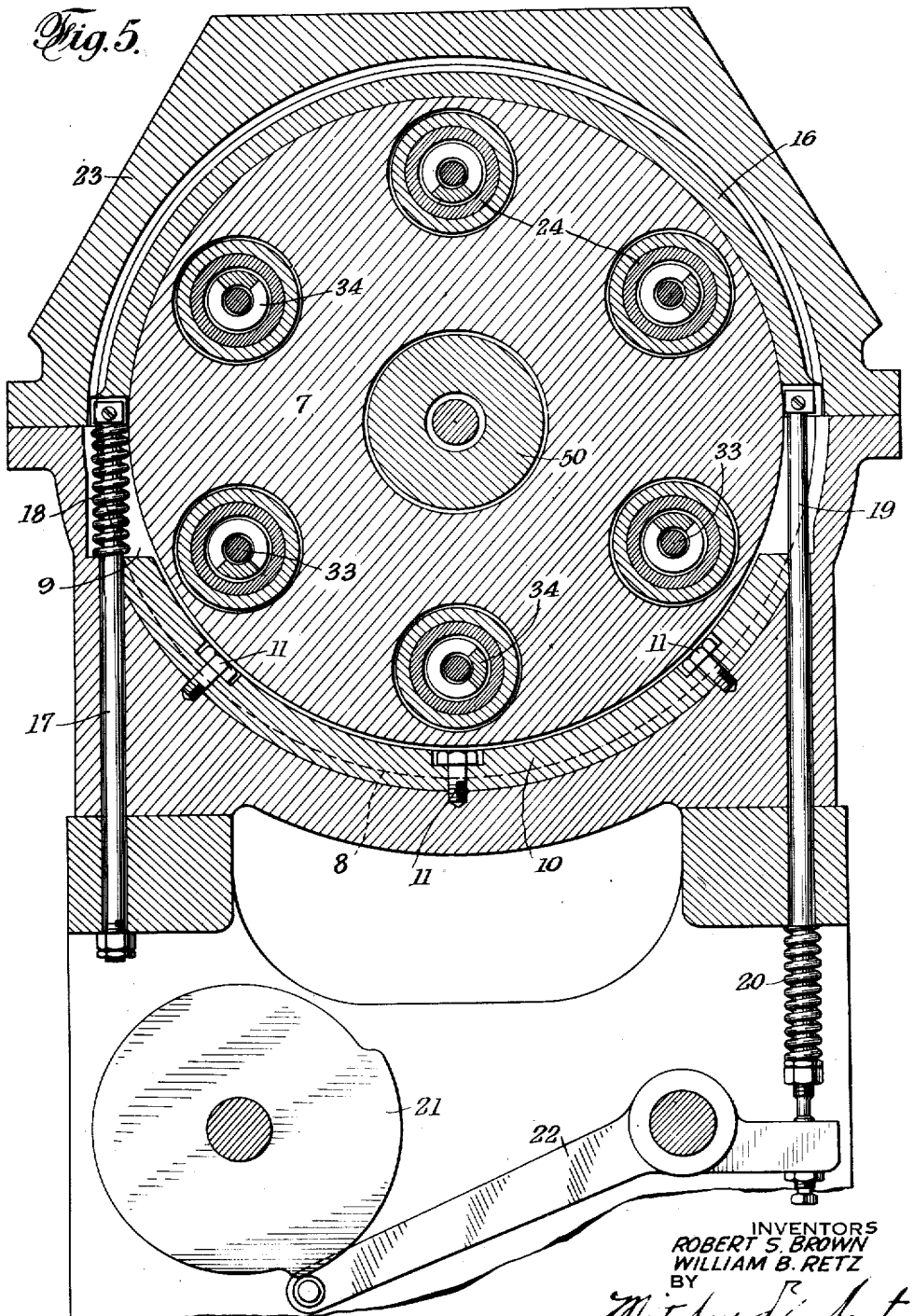

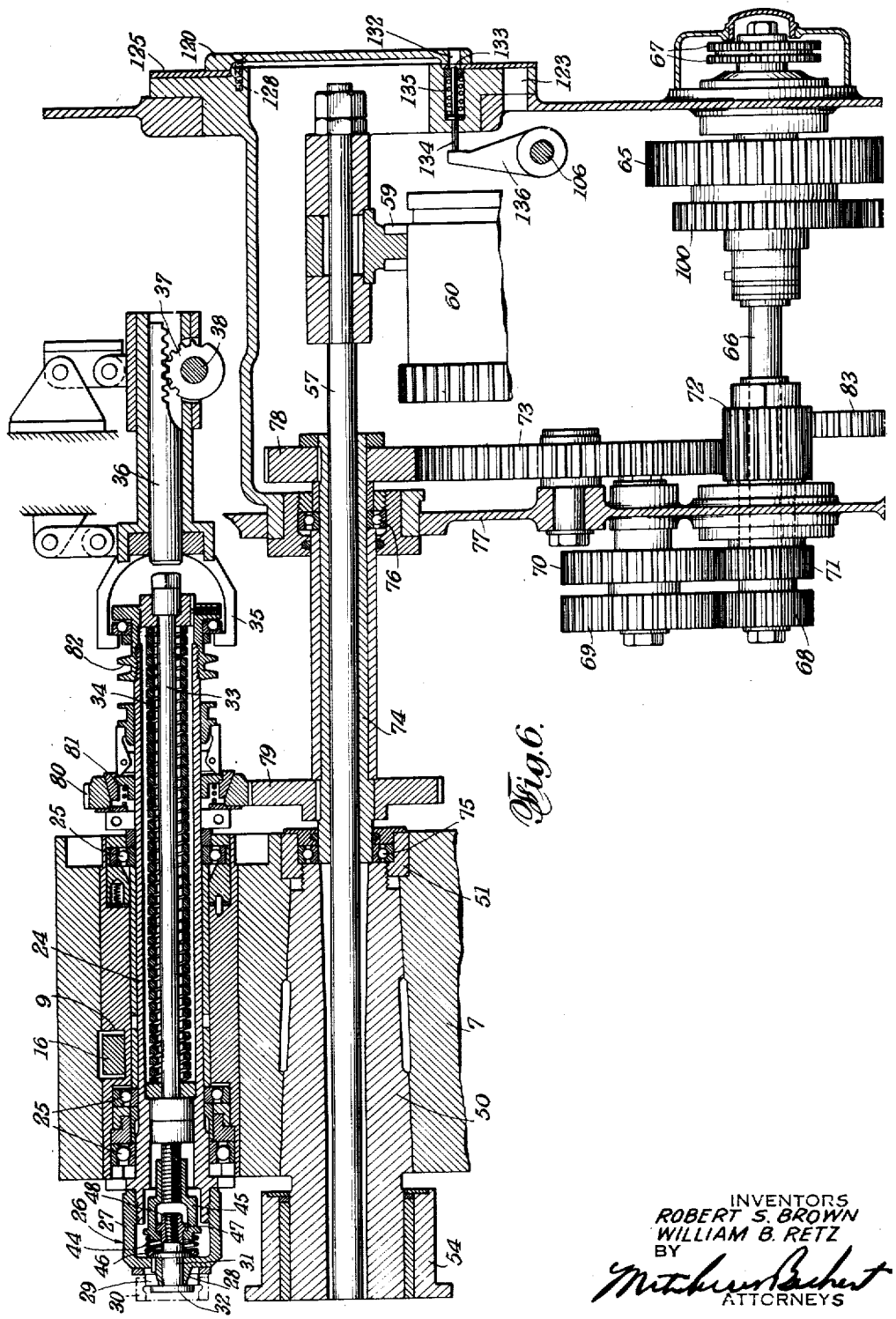

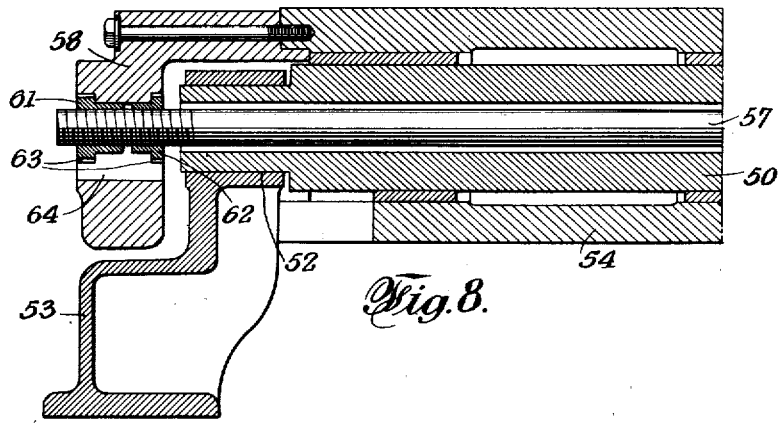
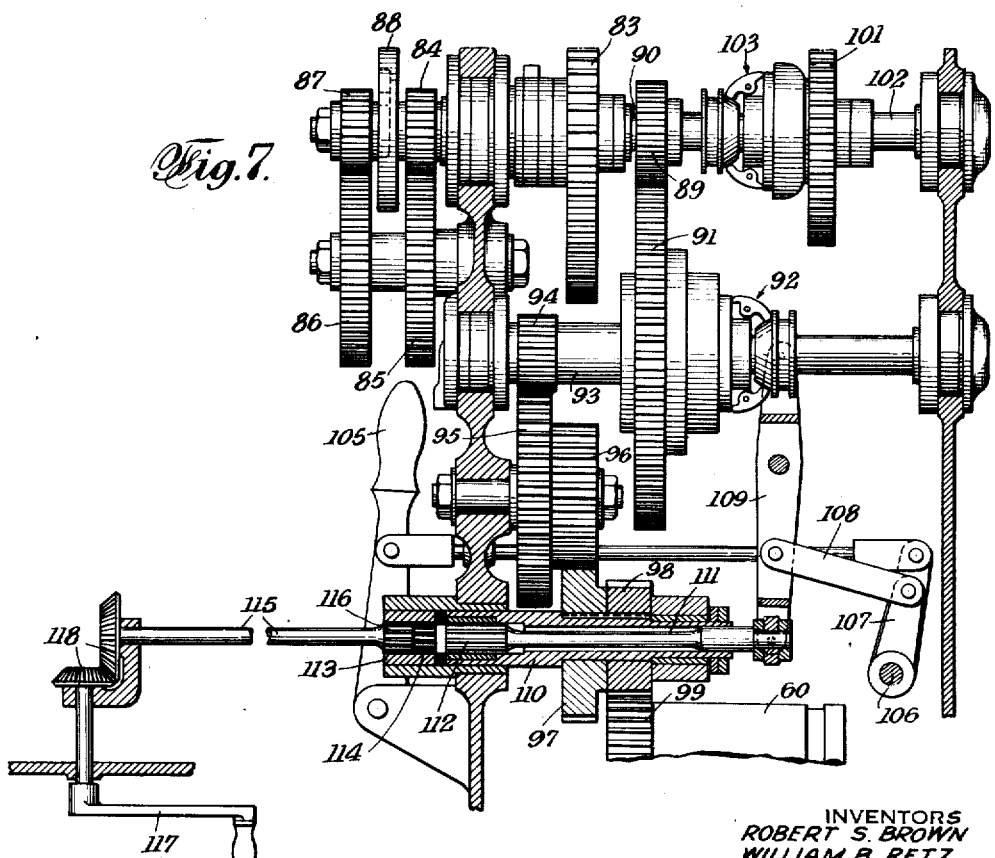

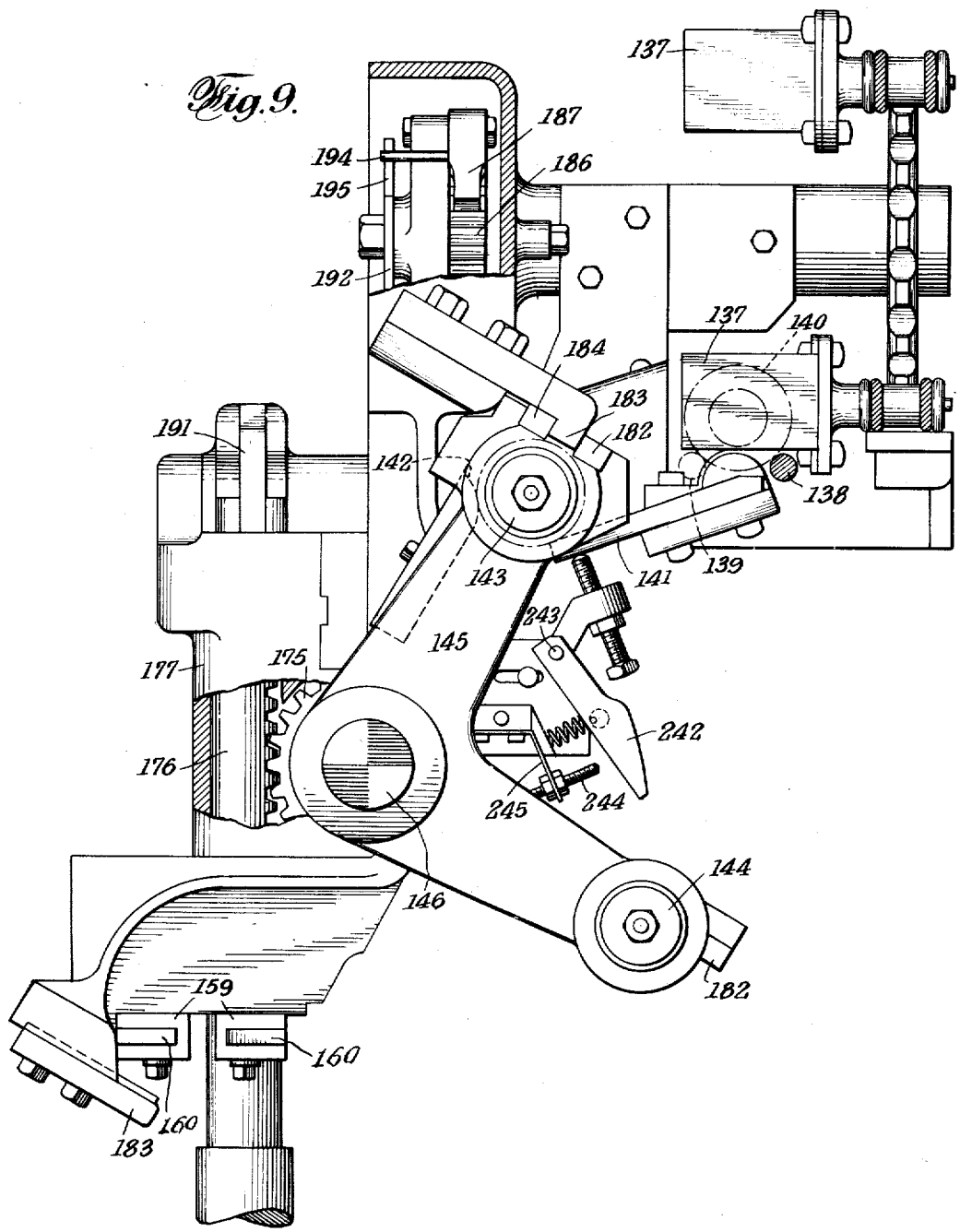

June 8, 1937.  R. S. BROWN ET AL  2,083,312
METALWORKING MACHINE
Original Filed July 1, 1931   12 Sheets—Sheet 9
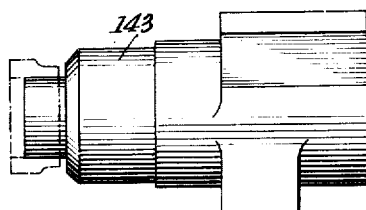
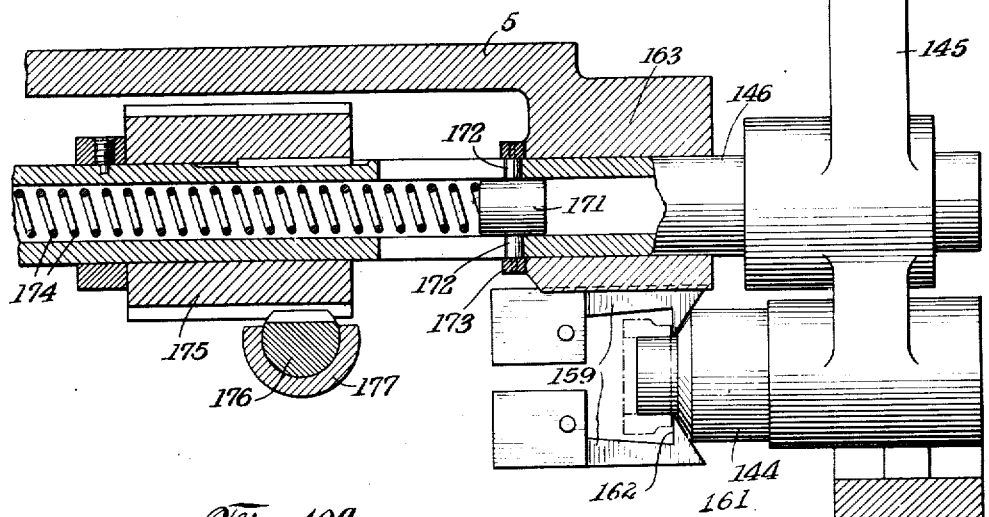
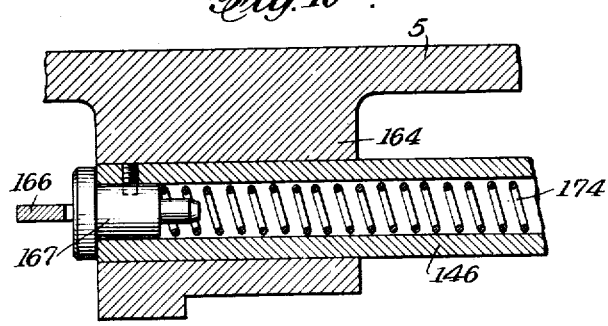
INVENTORS
ROBERT S. BROWN
WILLIAM B. RETZ
BY
ATTORNEYS

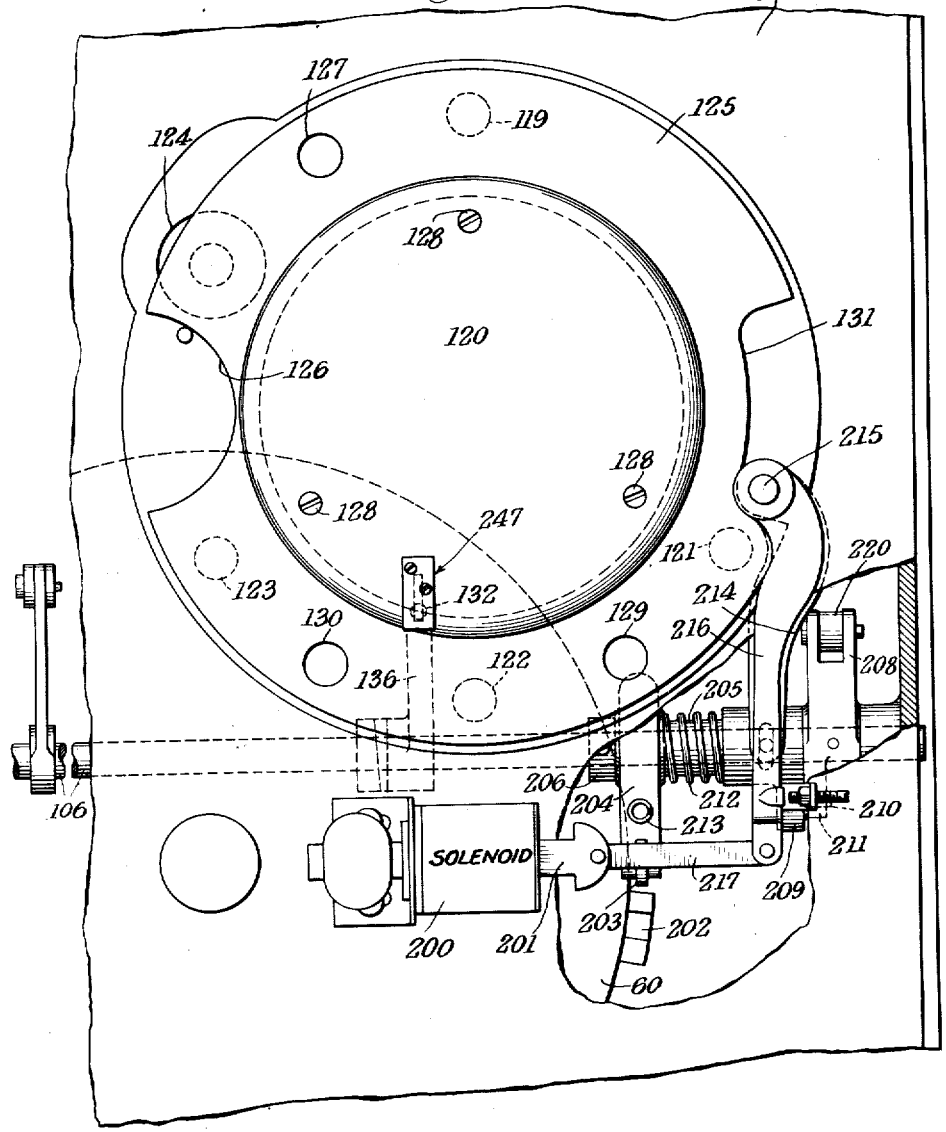

June 8, 1937.  R. S. BROWN ET AL  2,083,312
METALWORKING MACHINE
Original Filed July 1, 1931  12 Sheets—Sheet 11
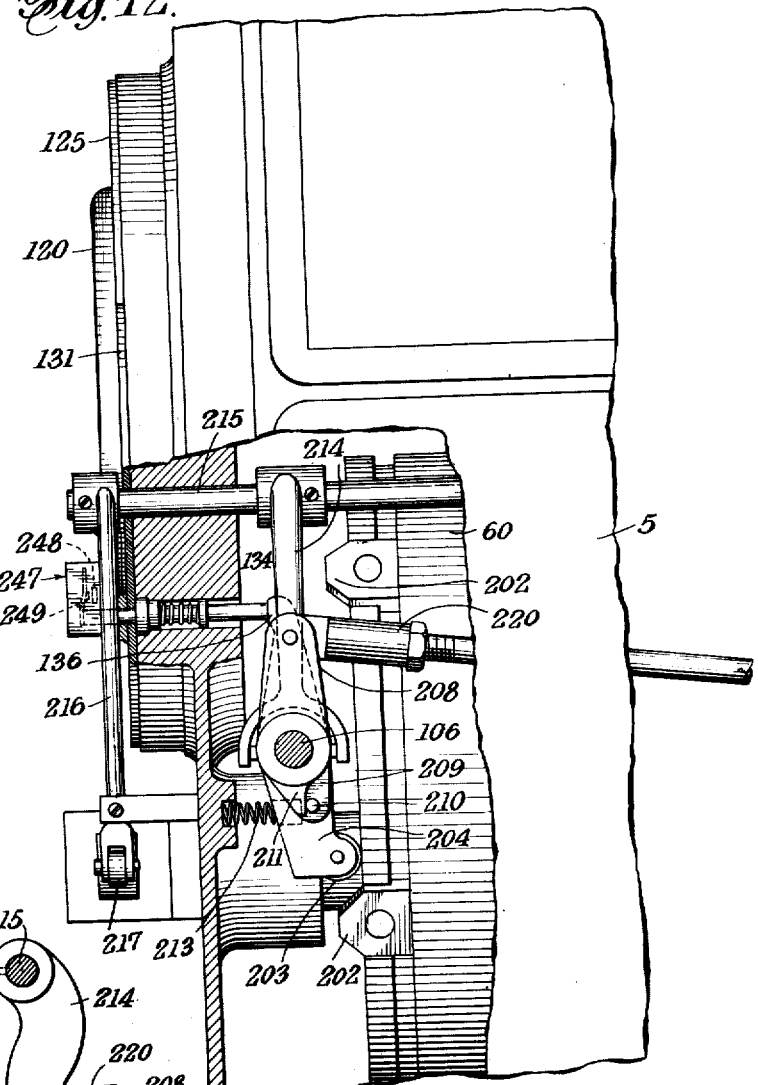
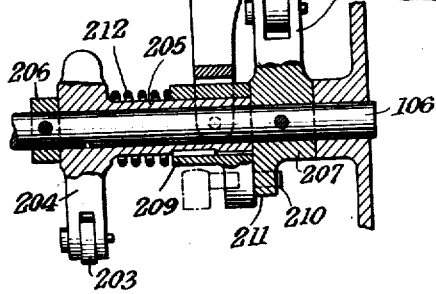
INVENTORS
ROBERT S. BROWN
WILLIAM B. RETZ
BY
ATTORNEYS

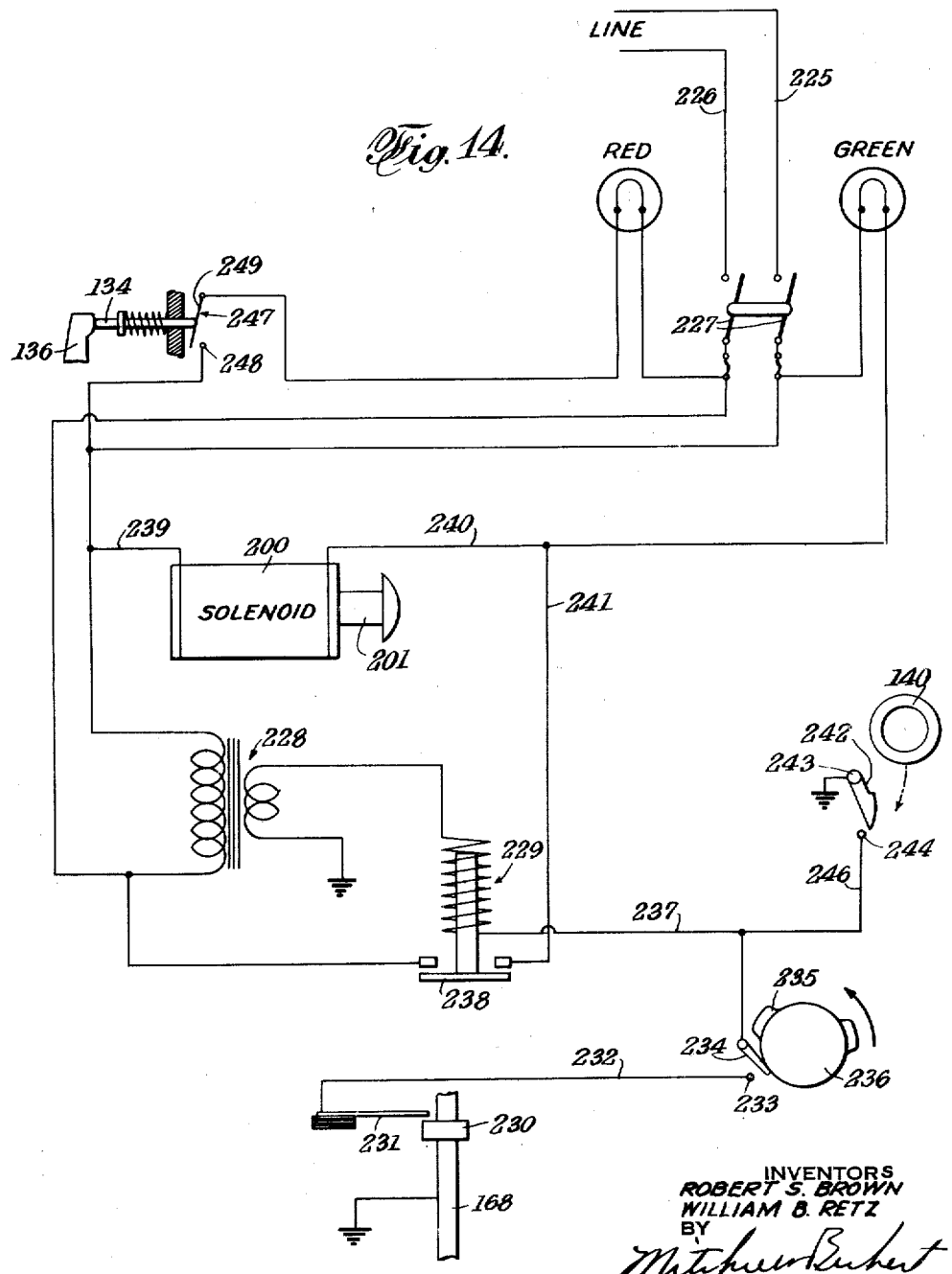

Patented June 8, 1937

2,083,312

UNITED STATES PATENT OFFICE 2,083,312

METALWORKING MACHINE

Robert S. Brown, New Britain, and William B. Retz, Plainville, Conn., assignors, by mesne assignments, to The New Britain Machine Company, New Britain, Conn., a corporation of Connecticut Original application July 1, 1931, Serial No. 548,098. Divided and this application January 8, 1936, Serial No. 58,132

19 Claims. (Cl. 29—38)

Our invention relates to a metal working machine and will be described as embodied in a multiple spindle automatic chucking machine of the work rotating type.

This application is a division of application Serial No. 548,098, filed July 1, 1931.

It is the general object of the invention to provide a machine of the character indicated having improved structural and functional features, with a view to producing a high production machine, which is sturdy, having a high degree of flexibility and safety in operation.

A further object of importance is to provide an automatic work feed or magazine feed arrangement having various safety features so as to avoid injury to parts of the machine and which is rapid and accurate in operation.

It is another object to provide a novel mechanism for automatically rendering the feed works inoperative upon an abnormal functioning of parts of the machine, and incidentally in connection therewith, signal means for indicating normal as well as abnormal functioning.

Other objects and features of the invention will either be pointed out or will become apparent upon a reading of the specification in connection with the drawings.

Briefly stated, the machine selected for embodiment of the invention includes a frame having a spindle carrier or turret indexibly mounted thereon and carrying a plurality of spindles. Each spindle is provided with chucking mechanism, which, in the preferred form, is automatically actuated at the loading station. The turret is rigidly held against end movement by an improved form of key or abutment mechanism, permitting free indexing but serving to rigidly hold the turret against end movement. The turret may be locked as usual by a locking bolt and may be clamped by a suitable clamping band associated with the turret in a novel manner. Extending from the turret is a tool slide guide upon which a tool slide is movably mounted. The tool slide may be actuated by a draw rod extending through the turret, and the drive for the spindles is preferably concentrically arranged relatively to the draw rod, and the parts are so related as to save space and provide a compact machine. The tool slide may be adjusted on the draw rod with ease and nicety by means of an improved adjustment which is provided. The chuck actuating devices may be very readily assembled and disassembled from the end of the machine, and there is a safety device to prevent accidental throwing in of the feed works while parts are in position for assembly and disassembly. In connection with the form of chucking mechanism herein disclosed, we provide a safety device to prevent injury to the chuck upon an abnormal movement of a chucking rod which is employed in the preferred form. The chucking is preferably automatically accomplished by cam means.

A magazine feed arrangement for automatically feeding work-pieces is so arranged as to pick up a rough work-piece from the magazine and to simultaneously remove a finished work-piece from a chuck in loading position. The transfer member is then moved so as to place the rough work-piece in the chuck and to simultaneously move the finished work-piece to a stripper from which the finished work-piece is removed to a suitable receptacle. The simultaneous functions performed by the transfer mechanism provides for accomplishment of all of the work feeding functions in substantially half of the time required by a transfer device which must perform the functions above noted successively rather than simultaneously. The magazine feed and transfer arrangement is so arranged as to minimize the danger of injury to any of the parts upon any abnormal functioning. Improved means preferably in the form of electrical contact means have been provided and arranged so that upon an abnormal functioning of the work feeding means, the feed works will be thrown out, whereas, upon a normal functioning, the machine is designed to operate automatically and the operator need do nothing more than keep the magazine filled with rough work-pieces. A single operator may therefore take care of the requirements of several machines. Upon an abnormal functioning, we preferably provide signal or telltale devices, such as a red light, to indicate a throwing out of the feed works, and we may also provide a signal mechanism, such as a green light, to indicate the normal and desired functioning of the machine.

In the drawings which show, for illustrative purposes only, a preferred form of the invention embodied in a multiple spindle automatic chucking machine—

Fig. 2 is a similar view of the middle portion of the machine and is substantially a continuation of Fig. 1;

Fig. 3 is a similar view of the right-hand portion of the machine and is substantially a continuation of Fig. 2;

Fig. 4 is a right-hand end view of the machine illustrated in Figs. 1, 2, and 3, parts such as cross slides being omitted;

Fig. 5 is an enlarged sectional view through the spindle carrier or turret and illustrating improved means for holding the turret against end movement and improved spindle carrier clamping means;

Fig. 6 is a fragmentary view from the rear of the machine of the spindle carrier and one spindle and chucking devices, together with a development of the spindle drive gearing;

Fig. 7 is a development view of a feed gearing and is substantially a continuation of the bottom of the gearing shown in Fig. 6;

Fig. 8 is a fragmentary sectional view from the rear of the machine of a tool slide and tool slide guide and illustrating an improved adjustment of the tool slide on its actuating rod;

Fig. 9 is an end view in elevation of a transfer mechanism and parts of an endless chain feed arrangement for work-pieces;

Figs. 10 and 10a are sectional views on an enlarged scale taken substantially in the plane of the line 10—10 of Fig. 2 and illustrate transfer mechanism and means for moving the same, Fig. 10a being a continuation of Fig. 10;

Fig. 11 is an end view in elevation of the left-hand end of the machine as shown in Fig. 1, parts being broken away to disclose interior construction;

Fig. 12 is a view of parts shown in Fig. 11 but viewed at right angles thereto, parts being broken away;

Fig. 13 is a sectional view of parts shown in Fig. 11;

Fig. 14 is a diagrammatic view illustrating the application of certain safety and signal means for the machine.

Figure 1:
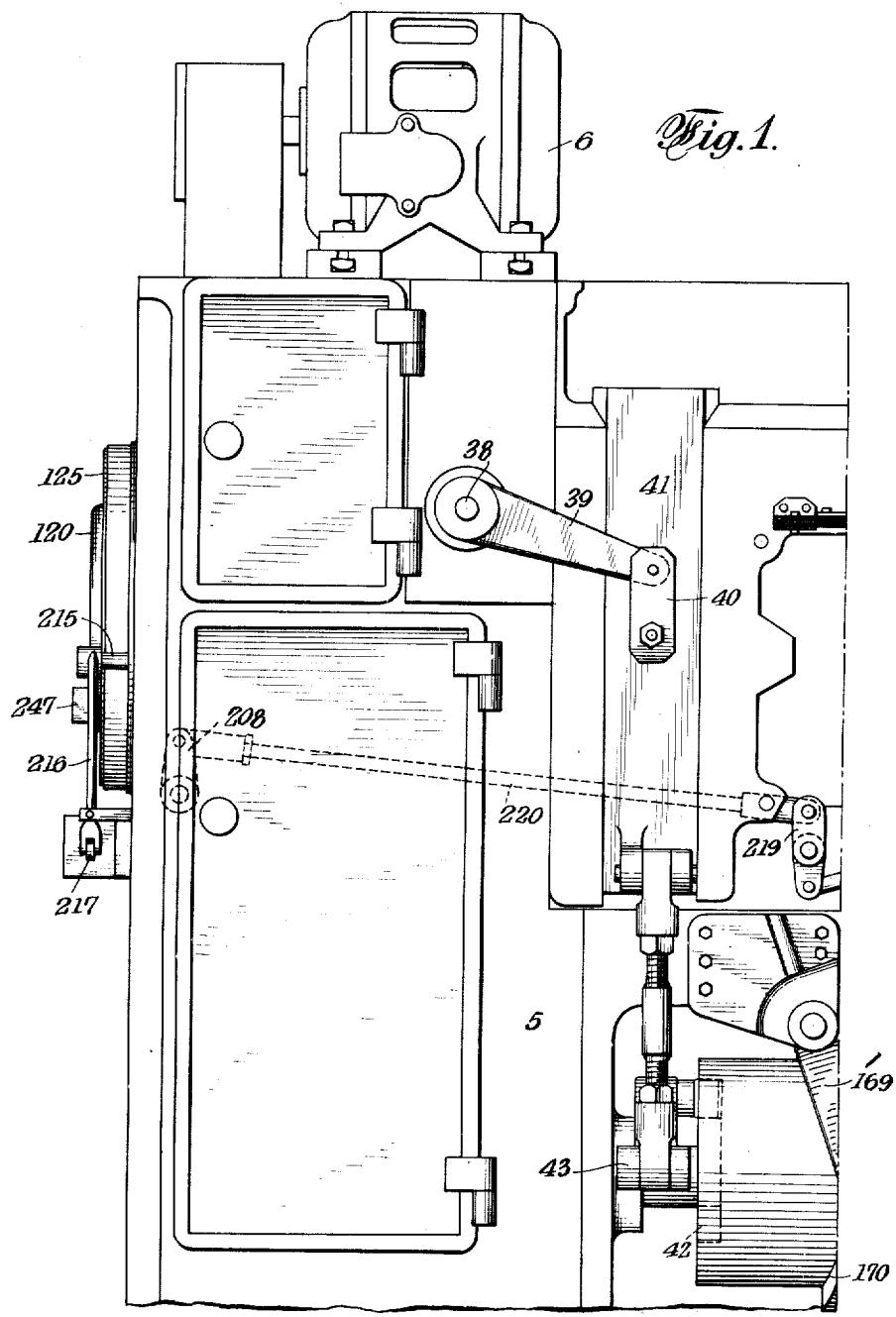
Fig. 1 is a view in front elevation of the left-hand portion of the machine.

The general features of the machine, together with certain improvements, will first be described, and then the magazine feed mechanism, together with certain safety devices, will be taken up.

The machine, in general, comprises a sturdy frame 5 having the main driving motor 6 mounted thereon. The turret or spindle carrier 7 is indexibly mounted in a substantially semi-circular bearing trough 8, whereby an extensive and very substantial bearing is provided over a considerable length of the spindle carrier and over approximately half of its circumference (Fig. 5). In order to very satisfactorily resist end movement of the spindle carrier under tool pressures, we provide key or abutment means intermediate the ends of the turret. As shown more particularly in Fig. 5, one of the parts, such as the turret, is provided with a circumferential groove 9, while the other part (in this case the frame) is provided with a segmental key member 10 secured to the frame as by means of screws 11—11 and holding the same very rigidly therein. The key member 10 is preferably of a width to fit quite snugly in the circumferential groove 9, and when the tool pressures are transmitted to the spindle carrier, the key and groove arrangement forms a very secure and rigid support for the turret against endwise movement, and this without any outside plates or flanges.

The turret may be indexed in any suitable manner, such as by means of a Geneva or a gear mechanism (not shown). The turret may be locked in indexed positions as by means of a locking bolt 12 (Fig. 2), which may be spring pressed in the locking direction by means of a lever 13 and springs 14—14 and which may be positively withdrawn by means of the cam 15.

In addition to the locking bolt 12, we preferably provide a clamping band or strap 16 which may lie in the upper portion of the groove 9, though, as shown particularly in Fig. 6, it need not fill the groove. The clamping band 16 is preferably held at one end by an adjustable rod 17, and a spring 18 may be provided for urging that end of the clamping band 16 upwardly. To the opposite end of the band 16, an actuating or draw rod 19 is secured. A heavy spring 20 serves to urge the draw rod 19 downwardly, and thus the clamping band 16 is moved into clamping position. The clamping band 16 is positively moved to unclamp the turret as by means of a cam 21 and lever 22 engaging the lower end of the rod 19. Thus, the clamping band 16 is always moved into clamping position by a substantially uniform and predetermined force by means of the spring 20, and wear of the parts will not substantially change the clamping force. The clamping band is positively moved to its unclamped position. The upper or cap portion 23 of the frame serves as a cover for the spindle carrier and is preferably free thereof.

As heretofore indicated, the spindle carrier 7 is provided with a plurality of rotatable spindles 24—24, which may be mounted on preloaded ball bearings 25—25 (Fig. 6). Each spindle carries at its forward end a chuck designated generally 26. As illustrated, each chuck comprises a housing or body 27 having a cam surface or cam surfaces 28 upon which ride chuck jaws 29—29. It will be seen that upon a rearward movement, that is, toward the right in Fig. 6 of the jaws 29, the latter will be moved radially outwardly so as to grip a work-piece, such as the bearing ring 30, or other work-piece having a bore therein. In order to move the jaws 29 rearwardly to the gripping position, a stud 31 having a head 32 engages the jaws and is slidably mounted in the body 27. The stud 31 is preferably moved in the chucking direction by means of a draw rod 33 and heavy spring 34 as shown herein, but which chucking arrangement, by means of draw rod and spring and actuating means therefor, are claimed broadly in Brown Patent, No. 1,887,621, granted November 15, 1932.

In order to move the draw rod 33 against the heavy chucking spring 34 there is provided a yoke device 35 to engage the rear of the spindle or, more properly, an anti-friction device carried thereby, and the yoke 35 carries a push rod 36 in the form of a rack engaged by a pinion 37 on shaft 38 mounted in the frame. The shaft 38 is rotated (Fig. 1) by means of an external lever 39 and link 40 on an actuating slide 41, which may be actuated by a cam and lever arrangement 42—43, as shown. Thus, upon movement of the slide 41 in one direction the pinion 37 will move the push rod 36 toward the left as viewed in Fig. 6, so as to compress a spring 34 and move the stud 31 through the instrumentality of a spring 44 which is interposed between the outside of a recessed head 45 and a flange 46 on the stud 31. In the interior of the recessed head 45 is an abutment head 47, which is secured as by means of a screw connection 48 to the stud 31. It will be seen that when the push rod 36 is released, as by movement of the slide 41, in the direction opposite to that last noted, the draw rod 33 will be forced rearwardly by the spring 34, and the shouldered head 47, being in engagement with the shoulder of the recessed head 45, will draw the stud 33 rearwardly so as to force the chuck jaws 49 outwardly into gripping position. Now, upon movement of the draw rod 33 toward the left, the recessed head 45 and spring 44 will force the stud 31 toward the left, to release the chuck jaws 29. Should the draw rod 33 be given more movement than is required for releasing the jaws 29, the head 47 may simply move rearwardly in the recessed head 45 and no damage to any of the parts of the chuck will result. In other words, the head 47 and recessed head 45 constitute a lost motion connection operable in one direction, so that the required movement of the draw rod 33 need not be so very accurately predetermined, and yet the jaws may be properly actuated.

In the form shown the spindle carrier 7 has centrally secured thereon a substantial tool slide stem 50, which may have a tapered fit thereon (Fig. 6) and be secured, as by means of a nut 51, threaded onto the rear end of the stem and engageable with a shoulder on the spindle carrier. The opposite end of the tool slide guide 50, as shown in Figs. 3, 4 and 8, is rotatably carried in a bearing 52 in the pedestal 53 on the frame of the machine. The tool slide 54 is slidable on the tool slide guide 50 and carries suitable tools, as will be understood. The tool slide 54 is guided and held against rotation during its feeding and return movements by means of a rigid arm 55, fitting in a longitudinal guideway 56 on the frame. The tool slide 54 is moved on its guide stem by means of a draw rod 57, adjustably secured at one end to the tool slide or an extension 58 thereof. The draw rod 57 extends through the guide 50, which is suitably bored for that purpose and extends to the left-hand end of the machine, where it is provided with a suitable cam follower 59, to be actuated on a cam on the main feed cam drum 60, as will be understood.

We have provided novel means for accurately adjusting the tool slide 54 on the draw rod 57 and for securing the same in adjusted position. In the form shown the tool slide 54 or, rather, the tail extension 58 thereof, is bored and counterbored to receive nuts 61—62 to engage opposite sides thereof. These nuts 61—62 are both threaded onto the end of the draw rod 57. Each of the nuts is provided with devices, such as gear teeth 63, and the tail extension 58 is longitudinally bored, as indicated at 64, so that a wrench in the form of a pinion may be passed thereinto. By means of such a pinion wrench either or both of the nuts may be engaged. With one of the nuts loosened up, both of the nuts may be rotated simultaneously so as to adjust the tool slide and draw rod 57 relatively to each other. When the proper adjustment has been made one of the nuts may then be turned up so as to very securely hold the draw rod to the tool slide. One of the nuts in effect serves as a lock nut for the other, and both nuts serve to effect adjustment.

A part of the spindle drive arrangement is of novel form and is so related to the tool slide draw rod 57 as to provide a compact and convenient arrangement. Fig. 6 shows more particularly the spindle drive works. A chain from the driving motor 6 (Fig. 1) serves to drive the sprocket 65 (Fig. 6) secured to the main drive shaft 66. The small gears 67 may be noted in passing as drive gears for a pump or pumps. The main drive shaft 66 passes to the left and secured thereon is a pick off gear 68 meshing with a second pick off gear 69 on a stub shaft. Pick off gear 69 is keyed to the gear 70 which in turn drives the gear 71 secured to the drive pinion 72, which in turn drives the gear 73. Gear 71 and pinion 72 may be fixedly mounted on a sleeve surrounding shaft 66 and free to rotate relatively thereto. By means of the pick off gears 68—69, any desirable spindle speeds may be secured.

In order to secure a concentric compact drive for all of the spindles, we provide a drive sleeve 74 which may be mounted on an anti-friction bearing 75 in the spindle carrier 7. A rear portion of the sleeve may be mounted on an anti-friction bearing 76 in the frame web 77. The drive sleeve carries a gear 78 meshed with and driven by the gear 73 which is driven by the pinion 72. The forward end of the sleeve 74 carries another gear 79 which is concentric with the spindle carrier and meshes with each of the spindle drive gears 80. Each spindle drive gear may be clutched and unclutched as by means of a clutch 81 from the spindle itself, and, if desired, a suitable brake may be engaged with a brake spool 82. In a chucking machine, each spindle when it reaches the loading position is normally unclutched from its drive so that the chuck may be loaded. The present concentric drive, however, may be employed in a screw machine. The novel driving arrangement including the drive sleeve 74 permits the passage of the draw rod 57 and may even act as a guide or support therefor if desired. The feed gear train is as follows:

During the normal feeding of the tools, the cam drive is from the drive pinion 72 (Fig. 6) to the drive gear 83 (Figs. 6 and 7). The drive gear 83 is rigidly connected by means of a sleeve to the gear 84 which meshes with a gear 85 keyed for rotation with a pick off gear 86. The gear 86 meshes with a second pick off gear 87 which drives one portion of an overrunning clutch 88, which in turn drives the gear 89 through the shaft 90. The gear 89 meshes with and drives the gear 91 carried by a part of the main feed clutch designated generally 92. When the main feed clutch is in as indicated in Fig. 7, the sleeve 93 and pinion 94 are rotated and the latter meshes with the gear 95 which in turn drives gear 96. Gear 96, through the two gears 97—98 and gear 99, drives the main feed cam 60. The above described drive is for the slow traverse or working portion of the cam rotation.

An accelerated drive is provided for driving the cam shaft at a higher rate of speed during the drawback, jump of the tools, indexing, spindle carrier locking, etc. The accelerated drive is from the main drive sprocket 65 and drive gear 100 (Fig. 6), which latter drives the gear 101 on the accelerated shaft 102 (Fig. 7). The gear 101 drives through a clutch 103, which in turn drives the shaft 90 and drive gear 89. The gear 89, by means of the gears 91, clutch 92 and gears 94 to 99 heretofore described, drives the main feed cam 60 at a rapid rate. This accelerated drive is permitted without unclutching the other gears heretofore described, because of the overrunning clutch 88, which permits the slow traverse gears to be driven in the usual manner and merely permits the gear 89 to run ahead of the normal drive of the slow traverse train. When the clutch 103 is out, the drive to the main feed cam 60 is through the slow traverse, and when the clutch 103 is in, the drive is through the accelerated gears or fast traverse. When the clutch 92 is out, it will be clear that there can be no drive to the main feed cam. As is usual in machines of this type, the clutch 103 is controlled by suitable dogs (not shown) on the main cam or some part coordinated therewith.

The main feed clutch 92 may be actuated manually by a handle 104 at the front of the machine, or a handle 105 at the rear of the machine. Both the handles 104—105 are suitably connected to a shaft 106 (Fig. 7) so that movement of either handle serves to rotate the shaft 106. The shaft 106 may carry a crank 107 connected by a link 108 to the clutch shaft lever 109, so that upon movement of either manual handle and consequent rotation of the shaft 106, the clutch 92 will be moved to either the "in" or the "out" position, as will be understood.

In connection with the main drive, we have provided a hand cranking mechanism (Fig. 7) constituting an improved safety mechanism to render the hand cranking mechanism inoperative when the main feed clutch is in and which may automatically render the hand cranking mechanism operative when the main feed clutch is thrown out. In the form shown, the gear 98, which drives the feed cam gear 99, is carried upon a pinion sleeve shaft 110, and a rod 111 is splined to the shaft as by means of the teeth or splines 112. One end of the rod 111 is connected to the clutch shaft lever 109 so that when the latter is moved to throw the clutch in either direction, the rod 111 will be moved longitudinally and will always be splined to the cam driving sleeve shaft 110. There is a short sleeve or bushing 113 mounted in the frame and which is provided with teeth or parts 114 for coaction with the spline parts 112 on the rod 111. A shaft 115 is rotatable with the bushing 113, and, as illustrated, we have provided the shaft 115 with splines or teeth 116 which mesh with the complementary parts 114 in the bushing 113. A hand crank 117 is connected to the shaft 115 as by means of bevel gears 118. It will be clear that with the main feed clutch 92 in the "in" position as shown in Fig. 7, the rod 111 is positioned at the right-hand limit of its movement, and the splines or teeth 112 are withdrawn from the sleeve or bushing 113. However, when the clutch shift lever 109 is rotated so as to throw the clutch 92 out, the rod 111 is moved to the left so that the teeth 112—114 mesh with each other, and upon rotation of the hand crank 117, the rod 111, and through it the cam driving sleeve shaft 110, will be rotated so as to rotate the gear 98 for driving the main feed cam 60. Thus it is impossible to throw in the hand cranking mechanism while the power feed is on, and by the mere act of throwing out the power feed by means of the main feed clutch 92 the hand cranking mechanism becomes operative.

There are other safety devices in connection with the main power feed clutch to prevent throwing in of the latter under certain conditions, as will be described. The machine is arranged so that a suitable bar or other tool may be inserted endwise to manually actuate the chucks in various stations. As shown more particularly in Figs. 6, 11, and 12, the frame is provided with a plurality of apertures 119—121—122—123 and a large aperture 124, each of these apertures being located in alignment with a spindle or chuck in various stations. These apertures are normally covered by a shiftable cover or annular plate 125 rotatably held to the frame as by means of a central disk 120 secured by screws 128. The cover or closure plate 125 is provided with means registering with the various apertures 119 to 124 when the cover plate is shifted to one position, and when shifted to another position, the cover plate serves to cover those apertures. As illustrated, the closure plate 125 has a large open notch 126 to register with the large apertures 124 in the frame, and is provided with smaller apertures 127—129—130. The closure plate may be further provided with an extended open notch 131 which permits access to the aperture 121 when shifted to one position. The notch 131 further permits the location of other parts on the frame, as will be later described.

Thus it will be seen that with the closure 125 in the position indicated in Figs. 6, 11 and 12, all of the frame apertures are covered. With the cover plate shifted clockwise, as viewed in Fig. 11, it will be seen that all of the frame apertures will be uncovered so as to permit access to the chuck actuating mechanisms. The various drive gears which may be in the way of a tool inserted through any of the frame apertures are preferably provided with spaced apart spokes, so as to readily admit a bar or other tool, as will be understood. The large aperture 124 is of sufficient size to permit removal or insertion of the chucking spring 34 and actuating rod 33 and other assembled parts.

The frame and cover plate 125 may further be provided with registering apertures 132—133, which are in registry with each other when the remaining openings in the frame and closure plate are out of registry and the frame openings therefore closed. Passing through the opening 132 is a rod 134 (Figs. 6, 11, which may be spring pressed inwardly by means of a spring 135. The rod 134 extends within the frame and is located in the path of a crank arm 136, carried by the shaft 106, which is oscillated for moving the main feed clutch 92. Thus, when the closure plate 125 is moved so as to uncover the frame openings 119 to 124, the openings 132 and 133 will be out of registry, and, by reason of the crank 136 and rod 134, it will be impossible to oscillate the shaft 106 and the main feed clutch 92 cannot be thrown in. By the means just described it will be clear that any tool inserted through the frame openings will have to be withdrawn and the cover plate 125 shifted so as to close all the frame openings before the main feed clutch can be thrown in. The rod 134, as will be later described in connection with certain electrical devices, is made use of for closing a normally open switch when the clutch is thrown out, so as to energize a signal device.

*Magazine feed*

We have devised an improved and very rapid method of automatically feeding work-pieces to the chucks and removing the same therefrom. We have also devised certain safeguards and telltale devices to prevent injury to the machine and to provide a check on its operation.

We may employ a magazine arrangement in the form of spaced plates 137—137 carried on an endless chain running over sprockets carried at the top of the frame. Beneath the lower run of the chain is a slideway which, in the form shown, consists of a pair of bars 138—139 so that work-pieces such as bearing rings, for example, 140 may be placed by the operator between adjacent spaced plates 137—137 and may rest on the two rods 138—139 and be slid therealong during movement of the chain. As will be later described, the chain is given a step by step movement so as to discharge a work-piece 140 at the proper time.

As shown best in Figs. 4 and 9, the work-pieces, shown as bearing rings, are moved along the guide rods 138—139, and when a work-piece reaches the proper location it moves down by gravity to the position indicated in Fig. 4. In order to permit this action, the guide rod 139 terminates just before the point at which it is desired to discharge a ring into a suitable holding device, and therefore when the ring passes beyond the end of the rod 139, it simply rolls or slides out from between its holding plates 137 and moves down the adjustable guide track 141 and into engagement with a second adjustable guide or stop 142 where it reposes as is indicated particularly in Fig. 4. The guides 141—142 are so positioned as to quite accurately locate the ring in any desired position to be picked up by a transfer device to be described.

In our preferred form, the transfer device is designed to pick up a rough work-piece from the holding device 141—142, and at the same time pick out a finished work-piece from the chuck 26 in loading position and then transfer the rough work-piece to the chuck 26 in loading position and at the same time transfer the finished work-piece from the chuck 26 to a stripping device and thereafter move away to permit indexing of the spindle carrier. In the form illustrated, our transfer device includes two transfer chucks 143—144 carried by a transfer arm device 145 on a rotatable and longitudinally slidable shaft 146 mounted in the frame.

The transfer chucks on the transfer arm 145 are spaced apart a distance equal to the distance between the chuck 26 in the loading station and the work piece 140 (Fig. 4), the location of which for convenience we shall term the magazine, since the work positioning means is, in fact, a part of the magazine arrangement. The space between the transfer chucks 143—144 is also equal to the distance between the chuck 26 in loading station and the stripping device, designated generally 159, and which may comprise a pair of spring pressed stripping jaws 160—160 (Figs. 2, 9 and 10, having tapered noses 161—161 to be engaged by the work piece and having shoulders 162—162 to engage behind the work piece so that, upon withdrawal of the transfer chuck, the work piece will be stripped and fall into a suitable hopper.

Movements of the transfer arm 145 and transfer chucks carried thereby consist of a longitudinal movement inwardly to pick up a rough work piece from the magazine and at the same time pick up a finished work piece from the chuck in loading position. Transfer chucks are next moved outwardly and then rotatably, so as to bring the rough work piece opposite the chuck in loading position and the finished work piece opposite the stripping device. The transfer arm is then again moved longitudinally inwardly so as to position the rough work piece in the chuck in loading position and the finished work piece in the stripper. The chuck is then closed automatically to grip the work piece therein and the transfer chucks are then again moved longitudinally outwardly to strip the finished work piece and leave the rough work piece in the machine chuck, after which the transfer device is again rotated upwardly to the initial position. These movements are accomplished as follows:

As shown particularly in Figs. 2, 10 and 10ᵃ, the transfer arm shaft 146 is journaled and slidable in spaced apart frame bearings 163—164. The shaft 146 is moved toward the right as viewed in the drawings by positive means, such as the lever 165, having a nose 166 to engage a plug or button 167 secured in the end of the hollow shaft 146. A link 168 is pivotally connected at one end of the lever 165, and at the opposite end to a bell crank lever 169, actuated in one direction by a cam 170 on the cam shaft. Thus, when the cam rocks the lever 169 so as to draw down on the link 168, the nose 166 in engagement with the button 167 positively moves the shaft 146 to the right, that is, in the direction to move the transfer chucks away from the magazine and machine chuck, which movement, as stated, removes a rough work piece from the magazine and a finished work piece from the machine chuck. After the shaft 146 has been rotated by means to be described the shaft 146 is moved toward the left, so as to position the work pieces carried by the transfer chucks in the machine chuck and stripper. This left-hand movement is preferably accomplished by spring means, so as to avoid injury to parts in case anything goes wrong with the machine.

In the form illustrated, a coil spring is located within the hollow shaft 146 and is sustained at one end by the button 167 and at the other end by a plug 171 having a pin therethrough forming gudgeons 172, held in a ring 173 which may abut a part of the frame, as shown particularly in Fig. 10. It will be clear that when the cam 170 permits, the shaft 146 will be resiliently moved to the left by the compression spring 174 and the link 168 will be raised to the position of Fig. 2.

The shaft 146 carrying the transfer mechanism is rotated by means, preferably including a cam and springs acting against limit stops. In the form illustrated, the shaft 146 has a long faced pinion 175 secured thereon (Figs. 2 and 10). A rack bar 176 is slidably guided in a bearing 177 on the frame and meshes with the pinion 175, so that upon movement of the rack bar 176 the shaft 146 and parts carried thereby will be rotated. A groove cam 178 (Figs. 2 and 4) serves to reciprocate the rack bar 176 through a connecting rod 179, and springs 180—181 preferably form part of the connecting means between the connecting rod 179 and the rack bar 176, as clearly appears in Fig. 2 and as will be understood. Needless to say, the cams 170 and 178 are of such form and are so located as to rotate the transfer arm and to move the same longitudinally at the proper times and in the proper sequence.

The operation of the transfer mechanism is as follows:

Assuming the transfer mechanism to be in the position indicated in Figs. 2 and 4, it will be seen that the cam 178 has raised the connecting rod 179 and through the spring 181 has moved the rack bar 176 upwardly to rotate the shaft 146, so as to bring one transfer chuck into alignment with the stripper mechanism 159 and the other transfer chuck into alignment with the machine chuck 26 in the loading station. The spring 174 in shaft 146 has served to rock the lever 165 and raise the link 168 so as to permit the shaft 146 and consequently the transfer chucks to move toward the left, that is, so as to convey the rough work-piece in the transfer chuck 143 into the machine chuck 26 in loading station and to bring a finished work-piece from the machine chuck 26 into the stripper 159. The spring connection between the rack bar 176 and the cam 178 has caused the transfer arm to be resiliently moved, until a guide block 182 (Fig. 9) contacted with the lower limit stop 183 adjustably secured on the machine frame. As stated, the spacing of the transfer chucks on the arm is such that when the limit stop 183 is engaged by the block 182, the work-pieces in the transfer chucks will be properly aligned with the machine chuck and the stripper.

Now upon movement of the cam 170, the lever 169 will be rocked so as to draw the link 168 downwardly and cause the nose 166 of the upper crank to positively shift the shaft 146 and transfer chucks toward the right, which movement serves to leave the finished work-piece in the stripper 159 and leave a rough work-piece in the chuck 26, it being understood that before this movement takes place the chuck 26 has been automatically closed by the means heretofore described. When the transfer chucks are free of the machine chuck and stripper they are so held free by a suitable dwell on cam 170, and the cam 178 then acts to draw downwardly on the connecting rod 179 and through the spring connection 180 the rack bar 176 is moved downwardly, so as to rock the shaft 146 and the transfer arm 145 into the rotative position shown in Fig. 9, which movement will bring the upper guide block 182 into engagement with the upper limit stop 183 adjustably secured on the frame. The arm 145 is provided with a shorter guide block 184, which short guide block permits the transfer arm 145 to swing into the position indicated in Fig. 9 when the shaft 146 is out the limit of its out movement. While the arm 145 is thus held in the position shown in Fig. 9 by the cam 178 and resilient connection heretofore described, the spring 174 slides the shaft 146 inwardly and resiliently moves the transfer chucks to the in position shown in Fig. 2. During this movement the lever 165, link 168, and lever 169 are moved to the positions shown in Fig. 2.

With the parts in the positions of Fig. 9 the transfer chuck 143 will pick up a rough work piece which has previously been dropped into the magazine positioning means 141—142 by means to be described, and the chuck 144 will at the same time pick up a finished work piece from the machine chuck 26 in loading position, which machine chuck is then automatically opened. During this in movement the transfer arm 145 is accurately guided by the two upper guide blocks 182—184, which will be in engagement with opposite sides of the limit stop 183, so as to accurately guide the transfer arm. The cam 170, through lever 169, link 168 and lever 165, will then positively move the shaft 146 and transfer arm to the right, so as to carry a rough work piece in the transfer chuck 143 and a finished work piece in the transfer chuck 144. During this longitudinal movement the short guide block 184 will pass beyond the end of the upper limit stop 183, and thereafter the cam 178, through the means heretofore described, will again rock the shaft 146, to move the transfer mechanism to the position indicated in Fig. 4, after which the cam 170 again permits the coil spring 174 to resiliently move the shaft 146 to the in position, so as to deposit a rough work piece in the machine chuck and enter the finished work piece in the stripper, as heretofore described.

Thus, in the time ordinarily required for removing a finished work piece from the machine chuck and conducting the same to a stripper, our transfer mechanism in addition picks up a rough work piece and transfers the same to the chuck. Considerable time is thus saved.

By the use of two transfer chucks instead of one, we not only save time but assure greater positiveness of action. One chuck which transfers rough work pieces is of appropriate size and design to properly grip surfaces on the rough work pieces, while the other chuck is of appropriate size and design to properly grip finished or other surfaces, on the finished work pieces. Thus, with each chuck designed to perform its single function, there will be greater certainty of action than where one chuck must handle both rough and finished pieces.

The chain portion of the magazine feed mechanism is moved in proper time with the transfer mechanism and is preferably moved by the same means that moves a part of the transfer mechanism. In the form shown (Figs. 2, 9) the shaft 185 of the inner sprocket for the chain is provided with a ratchet wheel 186, to be engaged and rotated by a pawl 187. The pawl is mounted upon a lever 188, which connects to one end of a link 189, the opposite end of which is connected to a bell crank lever 190, which in turn is connected by means of a link 191 to the rack bar 176 heretofore described. In order to determine the number of teeth on the ratchet wheel 186 to be picked up by the pawl 187 at each actuation thereof, we preferably provide a knock-off plate 192, which may be pivotally mounted on the shaft 185 and adjustably held as by means of a pin and slot connection 193 to the frame. The pawl 187 is provided with a pin 194 which, during actuation of the lever 188, rides up on a cam surface 195 on the plate 192, and thus causes the nose of the pawl to be withdrawn from the ratchet teeth and to prevent engagement of the nose of the pawl with another ratchet tooth until, by reverse actuation of the lever 188, the pin 194 is disengaged from the cam surface 195. Thus, by shifting the plate 192 and holding the same in adjusted position by means of the pin and slot connection 193, the pawl may be caused to pick up one, two, three or any desired number of teeth at each actuation, so as to cause a new work piece to be dropped into the magazine positioning arrangement 141—142 during each cycle. The magazine chain is thus actuated by the rack bar 176, so that a new work piece is dropped into the magazine positioning arrangement 141—142 at the time that the transfer arms are in their out position and during rotation of the transfer arm in a downward direction, so that, when the transfer arm is again moved to the upper position as shown in Fig. 9, a new work piece will have been previously deposited and will be ready to be picked up by the transfer chuck 143.

The resilient in movement of the transfer arm by the coil spring 174 prevents injury to the parts which might be occasioned were such movement positive and work-pieces or the like should jam in the chuck or magazine device. The resilient actuating means 180—181 likewise prevents injury to parts of the machine should there be any jamming action, and also obviates the necessity for very accurate positioning or camming of the parts, since the transfer arm is moved up against limit stops. Thus, the same cams will take care of work pieces of different sizes and different shapes and transfer chucks of different appropriate sizes, and, since the limit stops are adjustable, the transfer and magazine arrangements are exceedingly flexible.

In connection with the magazine loading device, we prefer to provide additional safeguards and telltale devices for automatically stopping the machine as by throwing out the feed clutch and at the same time providing a signal to indicate that the feed clutch has been thrown out whenever there is an abnormal action to the machine. We preferably also provide signal means in the form of a light to indicate that the machine is operating normally. In the form shown, we provide means for throwing the feed clutch in the event that the transfer chucks are prevented from moving up to the magazine device and the machine chuck or stripper, or in the event that for any reason they do not move to the normal extent. We may likewise provide means for throwing out the feed clutch in case the transfer chuck fails to pick up a work-piece, which failure might be due to a failure of the operator to load the magazine or to failure of some part of the machine preventing such pick up.

Referring particularly to the diagrammatic drawing of Fig. 14 and to Figs. 2, 9, 11, and 12, it will be seen that we provide a solenoid 200 having a core piece 201 which periodically during normal operation of the machine is energized and serves to prevent the feed clutch from being thrown out. However, upon an abnormal operation of the machine, the solenoid 200 is not energized, and the feed clutch is thrown out mechanically. The main feed cam 60, or any auxiliary cam synchronized therewith, is provided with one or more cam dogs 202, and in the path of these dogs is a cam roller 203 carried by a lever arm 204. The lever arm in the form shown is on a sleeve 205 loosely mounted on the shaft 106 between a fixed collar 206 and a fixed hub 207 carrying a lever arm 208 which is ultimately connected to a manual handle at the front of the machine, as will be described. It will be recalled that the shaft 106, as appears more clearly in Fig. 7, controls the position of the main feed clutch 92 so that upon oscillation of the shaft 106 that main feed clutch is thrown in or out. Splined to the sleeve 205 and slidable thereon is a sleeve or hub 209 which has means such as a pin 210 which is in the path of an ear 211 on the hub 207, which, as stated, is fixed to the shaft 106. A spring 212 normally holds the pin in the positions shown in Figs. 12 and 13 so as to be in the path of the ear 211. It will therefore be seen that with the pin engaged behind the ear 211, as shown when the cam roller 203 is engaged by a dog, such as 202, the arm 204 and with it the sleeve 205 will be rocked in a clockwise direction as viewed in Fig. 12. This rocking will cause the pin behind the ear 211 to rock the hub 207 and with it the shaft 106, which, as has been described, will throw out the main feed clutch and the feed functions of the machine will be stopped until the clutch is again thrown in manually. As indicated in Fig. 12, a coil spring 213 serves to urge the lever 204 into the position shown so as to position the roller 203 in the path of the dogs such as 202, and each time a dog passes the roller, the arm 204 is rocked.

Now, when all parts of the machine are functioning properly, it is not desired to have the main feed clutch thrown out each time the lever 204 is rocked by a dog 202, and the solenoid core 201 is made use of for withdrawing the pin 210 from behind the ear 211 so that rocking of the lever 204 will be a mere idle rocking movement and will not throw out the feed clutch. In the form shown, the sleeve or hub 209 carrying the pin 210 is engaged by a fork on a lever 214 fixedly carried by a shaft 215 mounted in the frame. Also fixedly carried by the shaft 215 is an arm 216 which is connected by means of a link 217 to the core 201 of the solenoid. It will be clear that when the solenoid is energized to draw the core 201 inwardly, the shaft 215 will be rocked so as to rock the fork lever 214 and withdraw the hub 209 and with it the pin out from behind the ear 211 so that a rocking of the arm 204 by the dog 202 will have no effect on the feed clutch. As soon as the solenoid is de-energized, as will be later described, the spring 212 again moves the hub 209 and pin 210 into the positions shown in Figs. 12 and 13 so that they are in position for clutch throwing.

The main feed clutch 92, in addition to being movable by means of the manual handle 105 at the rear of the machine, is movable by the handle 104 at the front of the machine through a link 218, rock lever 219, link 220 and arm 208 on the hub 207. Thus, the main feed clutch may be actuated manually from either the front or rear of the machine and may be automatically actuated by means of the pin and ear device heretofore described.

The electrical connections and devices for causing the solenoid 200 to be energized are shown more particularly in Fig. 14. We may provide line wires 225—226 and the main feed switch 227. A step down transformer 228 acts to reduce the voltage, and the low voltage current acts through a relay 229, for a purpose to be described. The link member 168 (Figs. 2, 14) which serves to positively move the transfer chucks outwardly, and which is itself moved upwardly by means of the coil spring 174 (Fig. 10) to resiliently move the chuck and transfer chucks inwardly, is provided with a contact 230 which is grounded through the machine. The machine frame carries an insulated contact 231 to be engaged by the contact 230 when the link 168 is moved to its predetermined upper position by means of the spring 174, as described. The contact 231 is connected by a wire 232 to a contact 233, which is engageable by a movable contact 234, movable by a dog 235 on what may be termed a distributor 236, forming a part of or movable with the main cam shaft. When the contact 230 is moved into engagement with the contact 231, there will be a flow from the ground connection through contacts 230—231, line 232, contacts 233—234 (when closed), thence through line 237 to actuate the relay and close the relay switch 238. When the relay switch 238 is thus closed, it will be clear that line current may flow through line 225, solenoid line 239, through the solenoid, then solenoid line 240, line 241, through the closed relay switch 238, and finally back through main line 226. When the solenoid is thus energized, the core 201 is drawn in and, as heretofore described particularly in connection with Figs. 12 and 13, the pin 210 is withdrawn from behind the ear 211, and rocking of the lever 204 by the dog 202 will have no effect on the main feed clutch.

If, for any reason, such as a jamming of parts, the rod 168 is not raised by the spring 174 so as to close the contacts 230—231, the relay 229 will not be energized, and the solenoid will not withdraw the pin 210 from behind the ear, and the feed clutch will be thrown out.

We preferably provide other safety devices, one of which is indicated particularly in Figs. 9 and 14. A movable contact member 242 grounded to the frame is pivotally mounted thereon at 243 and is spring pressed outwardly to the position shown in Figs. 9 and 14. An insulated contact 244 is mounted on a spring arm 245 on the frame in position to be engaged by the grounded contact 242. The contact 242 is positioned in the path of movement of a work-piece in a transfer chuck while the same is being transferred from the magazine positioning device 141—142 down to the position to be entered in the main machine chuck. In other words, each time a rough work-piece from the magazine is moved down by the transfer arm 145 it wipes along the contact 242 and closes the contacts 242, 244, so that, as shown in Fig. 14, current may flow from the grounded contact 242, contact 244, line 246, through the relay back to ground, so as to energize the relay and close relay switch 238, which closing, as heretofore described, permits line current to flow through the solenoid for drawing the core in and withdrawing the pin 210 from behind the ear 211, thus preventing the feed clutch from being thrown out by the dog 202 on the main cam.

If a transfer chuck should come down empty from the magazine, which might be occasioned by the failure of an operator to place work pieces in the magazine chain arrangement or which might be occasioned by some failure of the transfer chuck to pick up a rough work piece, which latter condition might entail difficulties in having work pieces ball up in the magazine positioning device or chuck, there would be no wiping of the contact 242, and the contacts 242, 244 would remain open and the solenoid would not be energized as heretofore described. If the solenoid is not energized, the feed clutch will be thrown out by the means heretofore described.

It will be clear from the diagrammatic showing of Fig. 14 that when the solenoid is energized the green light will be on, thus indicating each time that the solenoid is energized that the machine is operating normally.

We may also provide a red light, which comes on when the solenoid is not energized at the proper time and the main feed clutch is thrown out. Such means includes a switch 247, shown diagrammatically in Fig. 14 and shown more particularly in Figs. 11 and 12. This switch is normally open and comprises a fixed contact 248 and a movable contact 249. As has been heretofore described in connection with Fig. 6, an arm 136 is fixed to the shaft 106 and engages the end of the pin 134, which is spring pressed rearwardly. When the shaft 106 is rocked clockwise as viewed in Fig. 6, and counterclockwise as viewed in Fig. 12, so as to throw out the main feed clutch, the outer end of the pin 134 passes through the opening 133 and engages the movable contact 249, so as to cause it to engage the fixed contact 248 and close the switch 247. Upon reference to Fig. 14, it will be plain that when the switch 247 closes, the red light will come on and indicate that the main feed clutch has been thrown out.

It is to be noted that the dogs, such as 202, are so positioned on the main cam 60 that, during normal operation, the solenoid will be energized just prior to the time each dog 202 engages the roller 203, and preferably the solenoid remains energized until the dog 202 has passed beyond the roller 203. The wiping contact of a work-piece on the contact 242 is of relatively short duration and the solenoid remains energized during such wiping action. The time of engagement of the contacts 230—231 is of considerable duration, and it is for that reason that we prefer to provide a so-called distributor 236, which closes the contacts 234—235 just prior to the time that the dog 202 reaches the roller 203, and as soon as the dog 202 has passed beyond the roller 203, the cam member 235 on the distributor will permit the movable contact 234 to move, so as to open the circuit and deenergize the solenoid, which thus avoids the waste and heating effect incident to maintaining the solenoid energized for long periods.

It will be seen that if anything goes wrong with the functioning of the magazine feed arrangement, the main feed clutch is thrown out and the operator is provided with a signal to indicate that fact. As soon as the condition which caused the throwing out of the main feed clutch is remedied, the latter may be thrown in manually and thereafter, so long as the machine operates normally, the solenoid will be energized at proper points in the cycle of the machine and the feed clutch will not again be thrown out unless something else goes wrong.

From what has been disclosed it will be clear that we have provided a stop mechanism for a machine tool which may be actuated to stop the machine or its feed functions in response to one or more selected conditions or modes of action such as an improper functioning of the feed mechanism, as disclosed in the preferred form shown. The clutch or other stop means is thrown at a predetermined time in the cycle of the machine by mechanical means timed with other functions of the machine, and the solenoid means is employed to set or position means so as to cause the clutch throwing mechanism to act at the proper time. Thus the solenoid or motor means may be small since it is called upon to set the trigger and need not be sufficiently powerful to itself throw the clutch. The solenoid means involves two forces, one the force of the solenoid armature and the other the oppositely acting loading means such as the spring. One of the forces (in the embodiment shown in the spring force) serves to set the trigger mechanism while the other force (solenoid armature in the embodiment shown) serves to render the clutch throwing means inoperative. While the forces need not be applied as shown in the illustrative embodiment yet there are advantages in arranging the parts so that the solenoid armature force renders the clutch throwing means inoperative to throw the clutch, one advantage being that should the source of current to the solenoid fail the clutch would be thrown soon thereafter, thus advising the attendant that the machine requires attention.

It will be understood, by those skilled in the art, that when the machine is set up the various means for effecting indexing, locking and clamping of the turret, tool slide movements, work feeding, chucking, unchucking, etc., will be arranged so as to function at the desired times and in proper sequence during a cycle of the machine.

We have provided a machine having a considerable number of features of novelty, all looking toward accuracy and speed of production, as well as facility of operation and simplicity. We have also provided safety devices to guard against injury to parts should anything go wrong with the feeding of the work pieces.

While one preferred form of the invention has been described in considerable detail, it is to be understood that various changes, omissions and additions may be made within the scope of the invention as defined in the appended claims.

We claim:

1. In a machine of the character indicated, a magazine device, a chuck device, a stripper device, transfer means, means for imparting a movement to said transfer device in a direction axially of said chuck device for withdrawing a rough work-piece from said magazine device and simultaneously withdrawing a finished work-piece from said chuck device, and thereafter imparting a different movement to said transfer means for transferring said rough work-piece to said chuck device and simultaneously transferring said finished work-piece to said stripper device.

2. In a machine of the character indicated, an automatic feed device comprising a transfer member having means for carrying a work-piece, means for moving said transfer member longitudinally, means for moving said transfer member rotatably, and mechanism actuated by one of said two last mentioned means for feeding a rough work-piece.

3. In a device of the character indicated, a transfer member having spaced apart holding devices for work pieces, means for moving said transfer device for engaging a rough work piece in a magazine device and simultaneously engaging a finished work piece in a chuck and thereafter moving said transfer device longitudinally for withdrawing said work pieces, and means for oscillating said transfer device to bring said rough work piece into alignment with said chuck and said finished work piece into alignment with a stripping device, said transfer device being longitudinally movable to position said rough work piece in said chuck and said finished work piece in said stripper, and being longitudinally movable in the opposite direction so as to leave said rough work piece in said chuck and leave said finished work piece in the stripper.

4. In a device of the character indicated, an endless chain device having a plurality of spaced means for work-pieces, pawl and ratchet mechanism for moving said endless chain device with a step by step movement, and means associated with said pawl and ratchet mechanism to permit variation of the number of ratchet teeth to be engaged by the pawl, for the purpose described.

5. In a machine of the character indicated, a feed clutch, a transfer device for transferring work-pieces, electrical means actuatable by a work-piece held by said transfer device, and means for throwing said feed clutch upon the absence of a work-piece from said transfer device.

6. In a machine of the character indicated, a feed clutch, cam and follower means normally positioned to automatically throw said feed clutch at a predetermined point in the cycle of the machine, magazine feed means for said machine, and electrical means for rendering said cam and follower means inoperative to throw said feed clutch during normal operation of said magazine feed means, said cam and follower means being connected to said feed clutch to throw the same upon an abnormal functioning of said magazine feed means.

7. In a machine of the character indicated, a feed clutch, means for throwing said feed clutch at a predetermined point in the cycle of the machine, a magazine feed arrangement for the machine, and solenoid mechanism operable upon a normal functioning of said magazine feed arrangement for rendering inoperative said means for throwing said feed clutch.

8. In a machine of the character indicated, a feed clutch, automatic magazine feed mechanism, and means operable upon an abnormal functioning of said magazine feed arrangement for throwing said feed clutch, and a signal indicating that said clutch has been thrown.

9. In a machine of the character indicated, a main feed clutch, means for disengaging the same comprising means actuated periodically during the machine cycle and electrically controlled means for rendering said periodically actuated means operative to disengage said clutch.

10. In a machine of the character indicated, a clutch, a clutch throw out member, a machine actuated member, means including an electric motor means for controlling the coaction between said machine operated member and said clutch throw out member whereby the throw out action of said machine actuated member on said clutch throw out member is controlled.

11. In a machine of the character indicated, a clutch, a clutch throw out member, a machine actuated member, means for controlling the coaction between said two members including a spring for urging said members relatively to each other in one direction, a solenoid acting against said spring and urging said members relatively to each other in the opposite direction, and means for controlling the circuit of said solenoid in accordance with a condition of operation of the machine.

12. In a machine of the character indicated, a clutch, a clutch throw out member, a second member, means for actuating said second member periodically in synchronism with the operation of the machine, and means for definitely positioning said members relatively to each other whereby said clutch throw out member will be actuated by said second member, for the purpose described.

13. In a machine of the character indicated, a clutch, a clutch throw out member, a machine actuated member, means for causing said members to coact with each other, and means for breaking the coaction of said members with each other periodically during normal machine operation.

14. In a machine of the character indicated, a clutch, a clutch throw out member, a machine actuated member, and means including a solenoid for controlling the coaction between said two members, for the purpose described.

15. In a machine of the character indicated, a clutch, means including electric motor means for throwing said clutch, and means for controlling the circuit to said electric motor means in accordance with machine operation.

16. In a stop mechanism for a machine of the character indicated, a machine control member operable to stop the machine, a stock carrier intermittently movable about an axis to transfer stock from station to station, and means operable upon an intermittent movement of said stock carrier for actuating said machine control member to stop the machine upon a failure of stock in said stock carrier.

17. In a stop mechanism for a machine of the character indicated, a machine control member operable to stop the machine, a stock carrier intermittently movable about an axis to transfer stock from station to station, and means including electric control switch means under the control of said stock carrier during an intermittent movement thereof for actuating said machine control member to stop the machine upon a failure of stock in said stock carrier.

18. In a stop mechanism for a machine of the character indicated, a feed clutch for the machine, a stock carrier intermittently movable about an axis to transfer stock from station to station, and means rendered operative upon a failure of stock in said stock carrier to release said feed clutch upon an intermittent movement of said stock carrier.

19. In a stop mechanism for a machine of the character indicated, a machine control member operable to stop the machine, a stock carrier movable about an axis to transfer stock from station to station, and means operable upon a movement of said stock carrier about said axis for affecting said machine control member to stop said machine, for the purpose described.

ROBERT S. BROWN.
WILLIAM B. RETZ.